J. H. TRIMBLE AND C. F. FINK.
CALCULATING MACHINE.
APPLICATION FILED AUG. 13, 1914. RENEWED JUNE 13, 1919.
1,326,428. Patented Dec. 30, 1919.
9 SHEETS—SHEET 3.
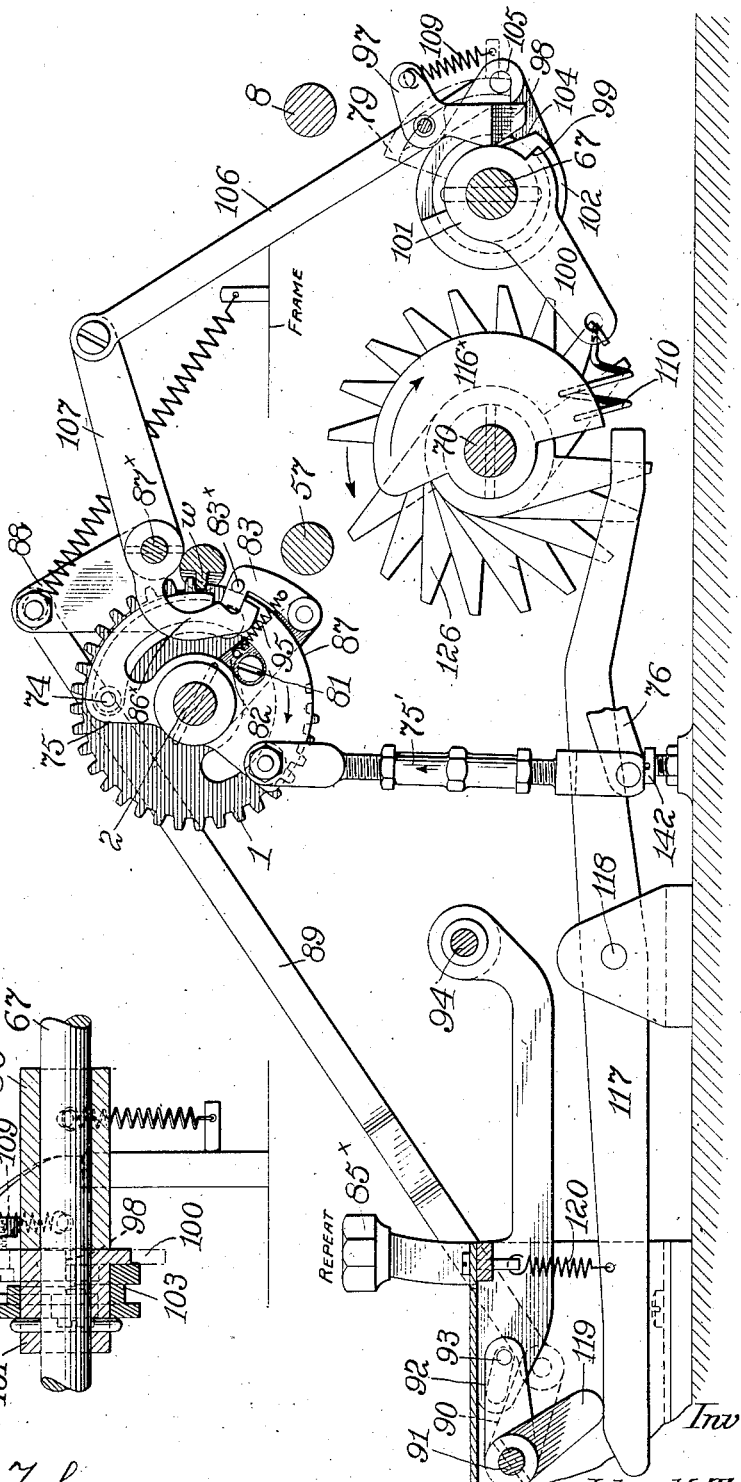
Attest:
Ewd L. Tolson
C. E. Parsons
Inventors.
John H. Trimble,
Charles F. Fink,
by Spear, Middleton, Donaldson & Spear,
Attys.

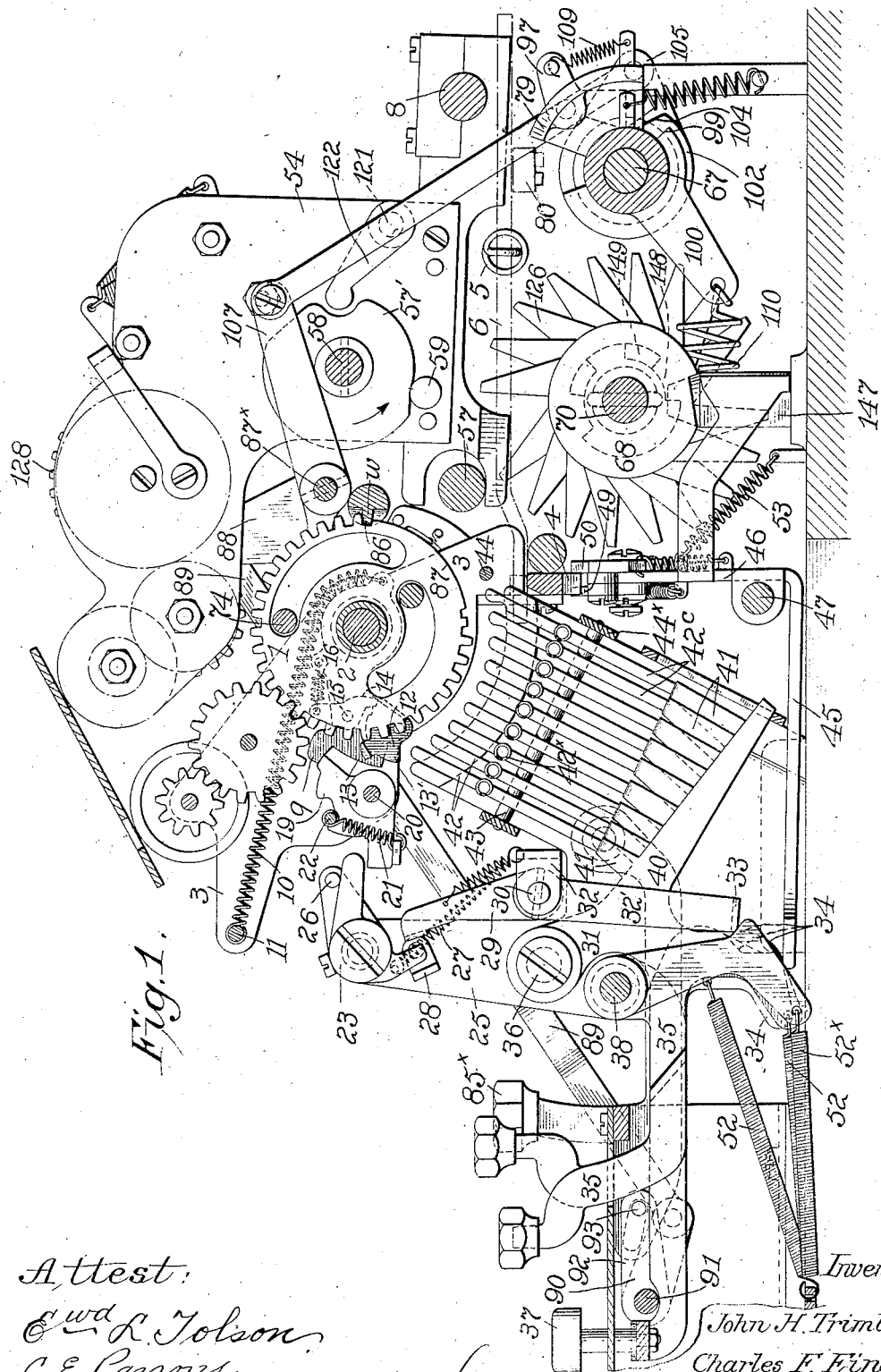

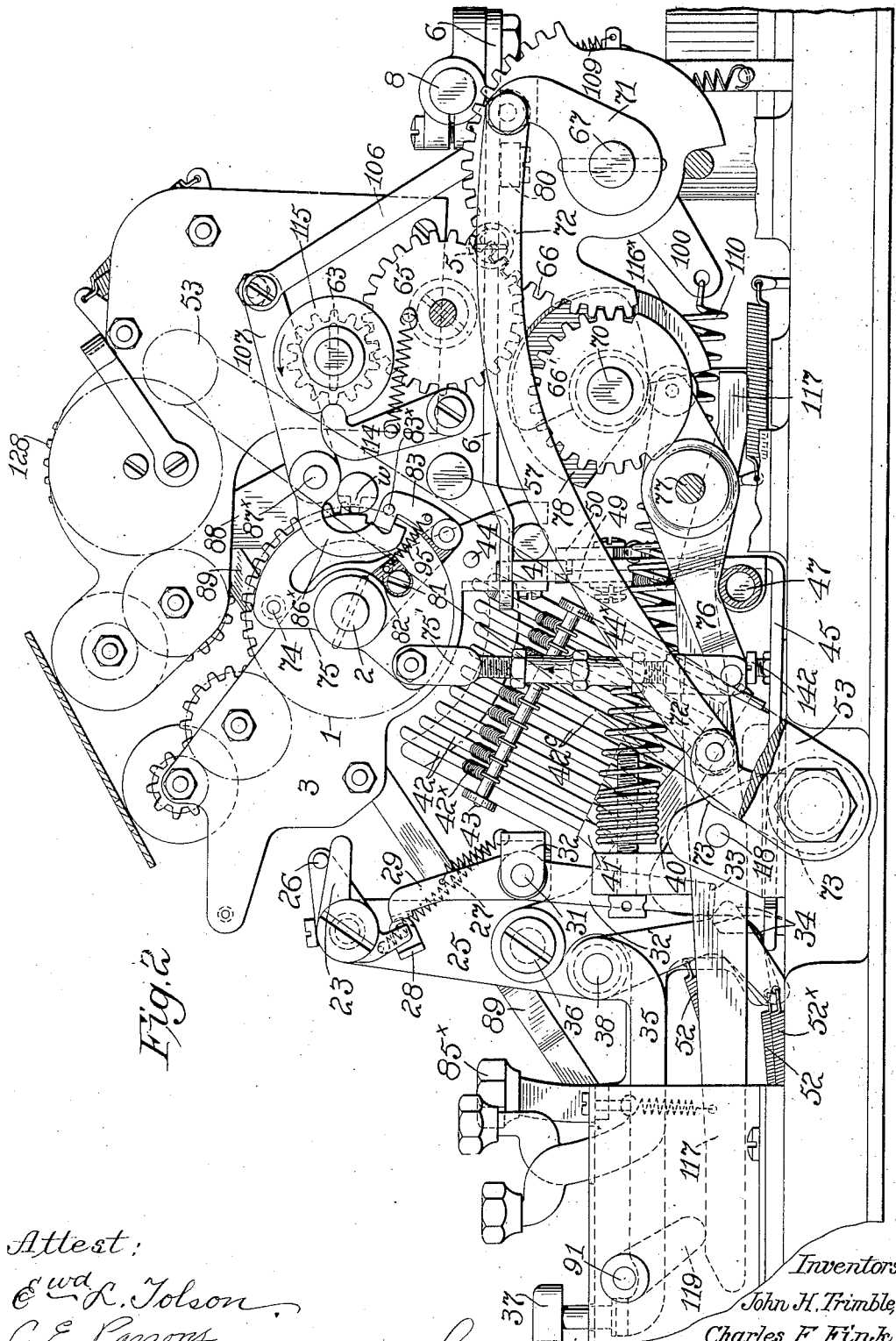

J. H. TRIMBLE AND C. F. FINK.
CALCULATING MACHINE.
APPLICATION FILED AUG. 13, 1914. RENEWED JUNE 13, 1919.
1,326,428.
Patented Dec. 30, 1919.
9 SHEETS—SHEET 4.
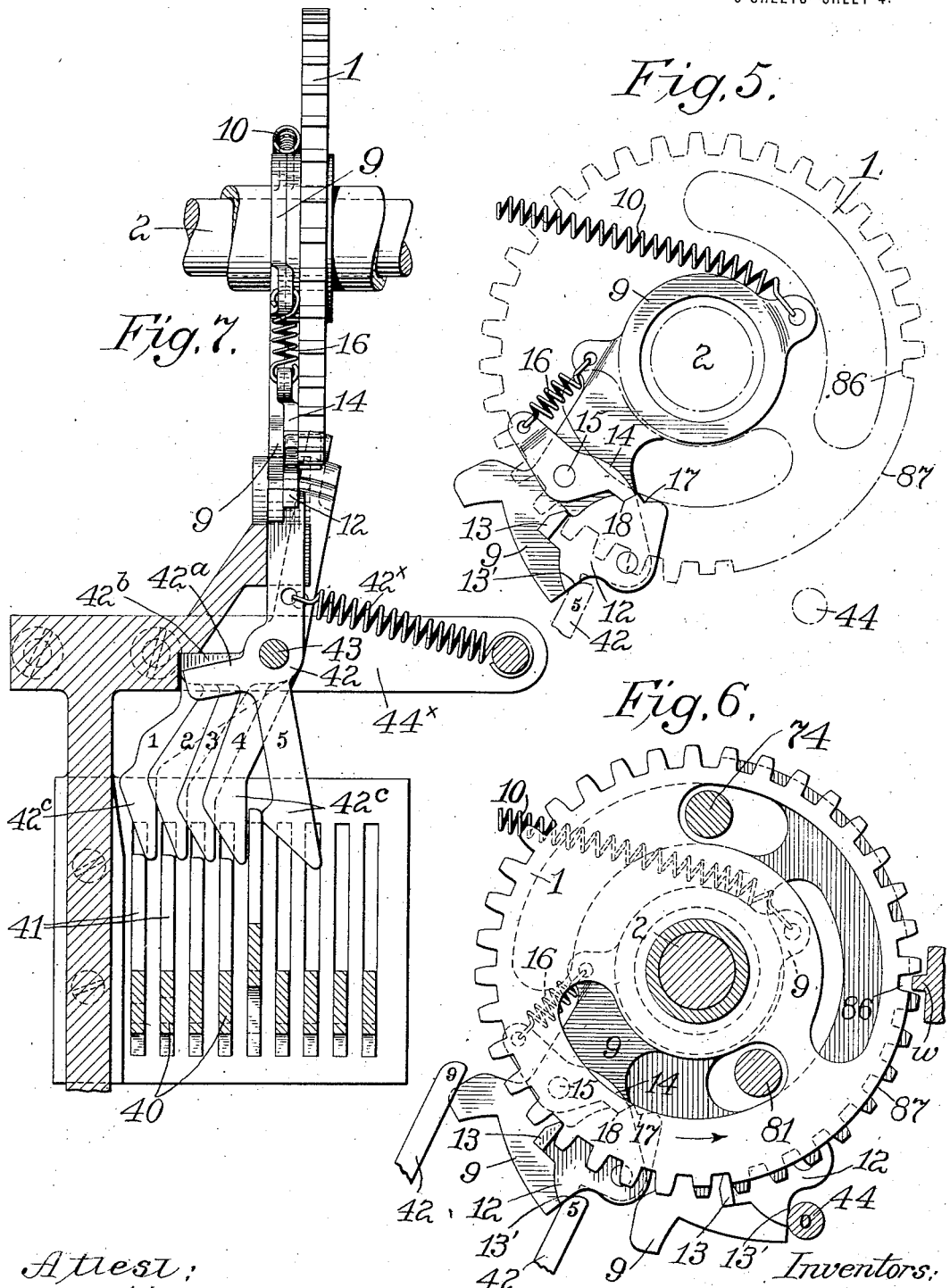

J. H. TRIMBLE AND C. F. FINK.
CALCULATING MACHINE.
APPLICATION FILED AUG. 13, 1914. RENEWED JUNE 13, 1919.
1,326,428.
Patented Dec. 30, 1919.
9 SHEETS—SHEET 5.
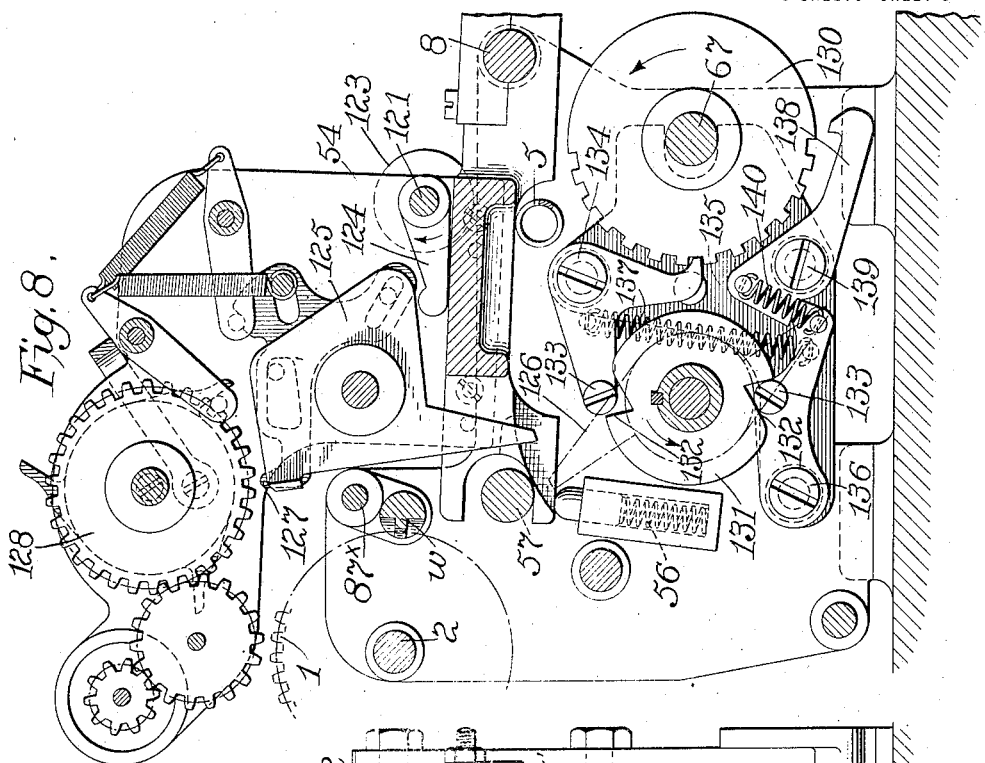
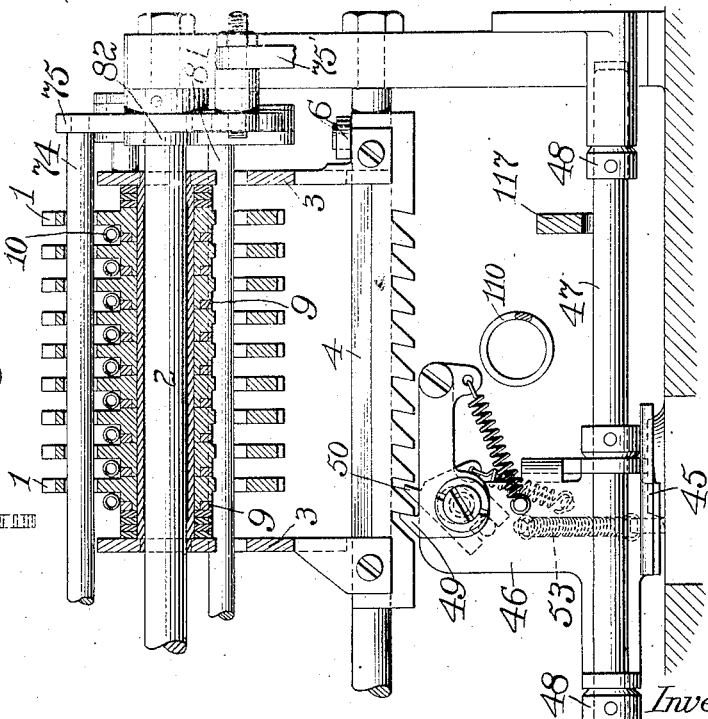
Attest:
Ewd L. Tolson
C. E. Parsons
Inventors:
John H. Trimble,
Charles F. Fink,
By Spear, Middleton, Donaldson & Spear
Attys.

J. H. TRIMBLE AND C. F. FINK.
CALCULATING MACHINE.
APPLICATION FILED AUG. 13, 1914. RENEWED JUNE 13, 1919.
1,326,428.
Patented Dec. 30, 1919.
9 SHEETS—SHEET 6.
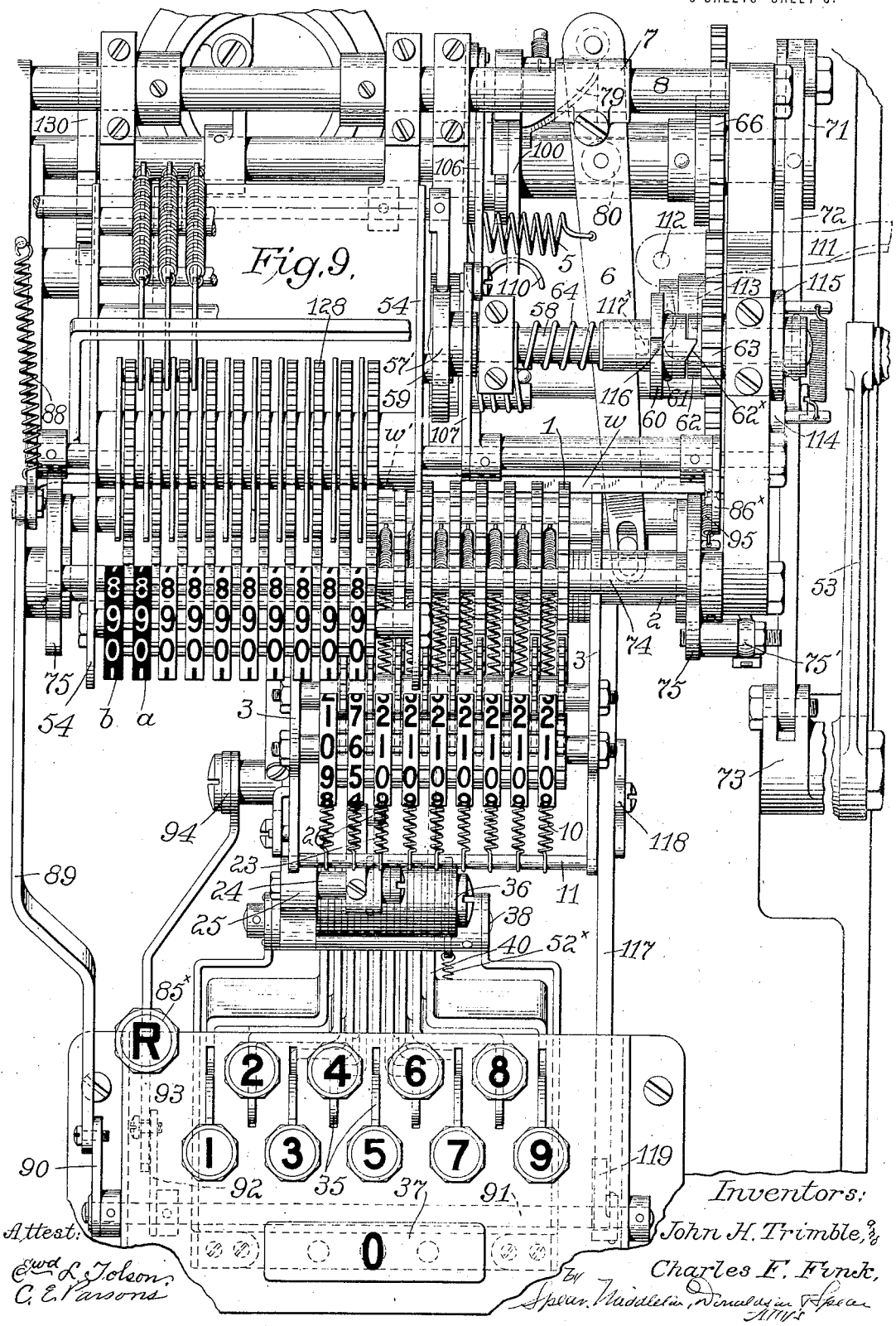
Inventors:
John H. Trimble,
Charles F. Fink,
Attest:
Ewd L. Tolson
C. E. Parsons

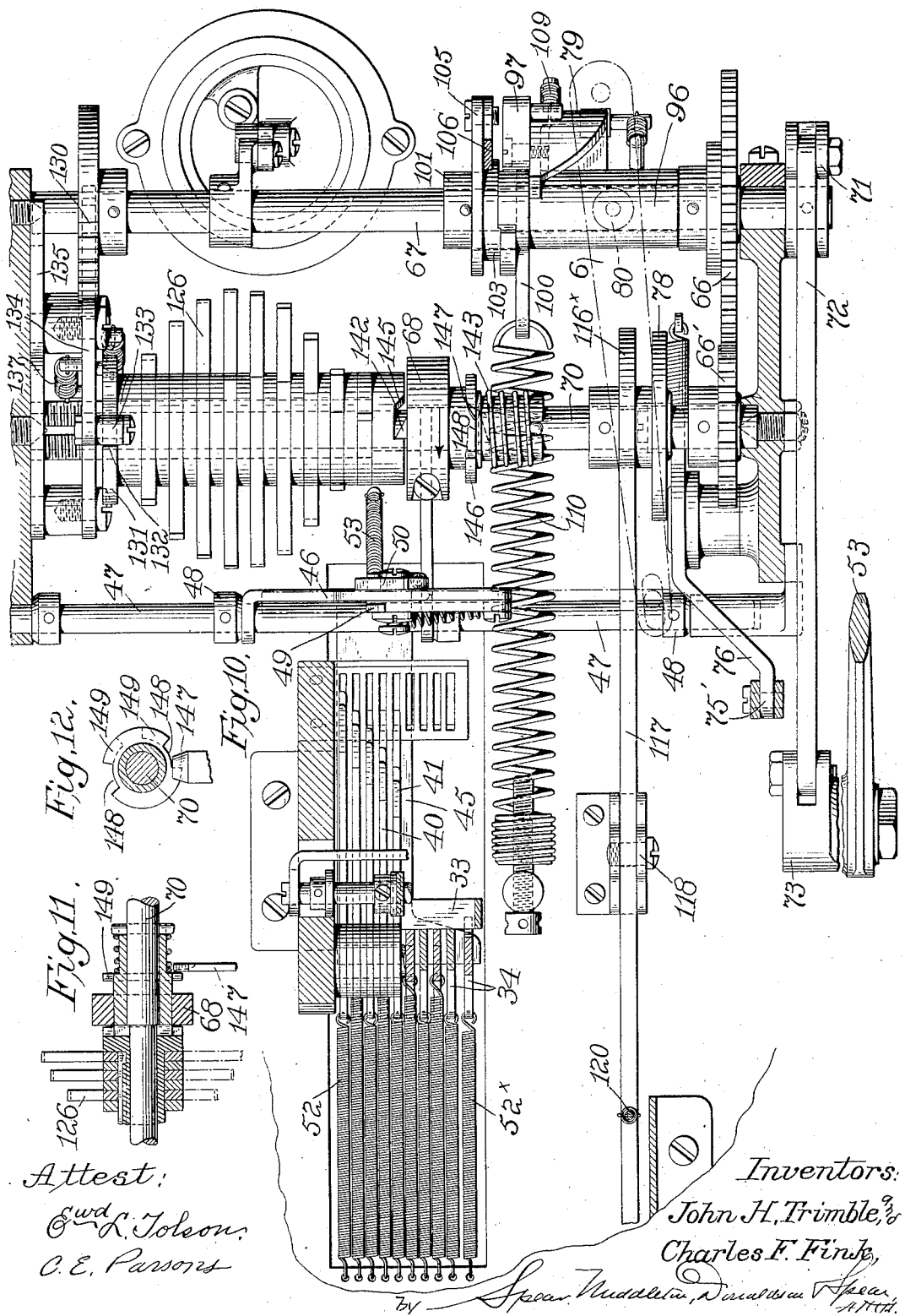

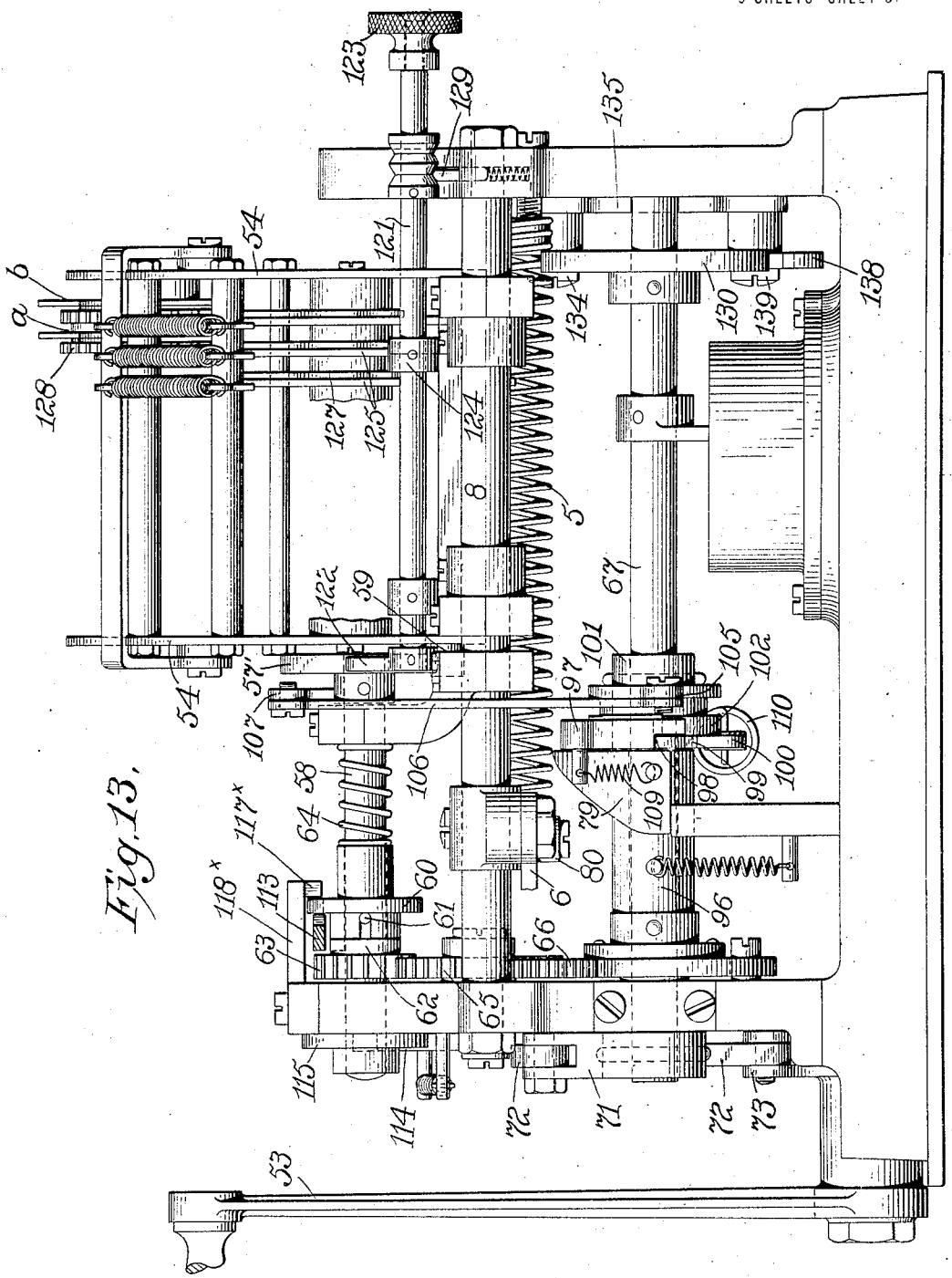

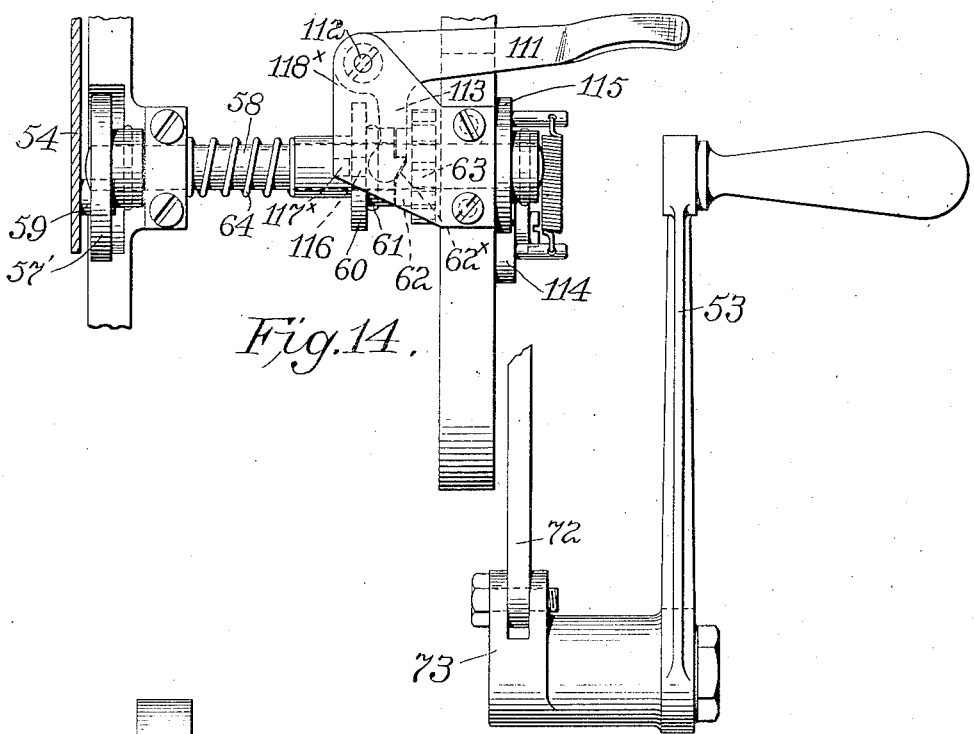
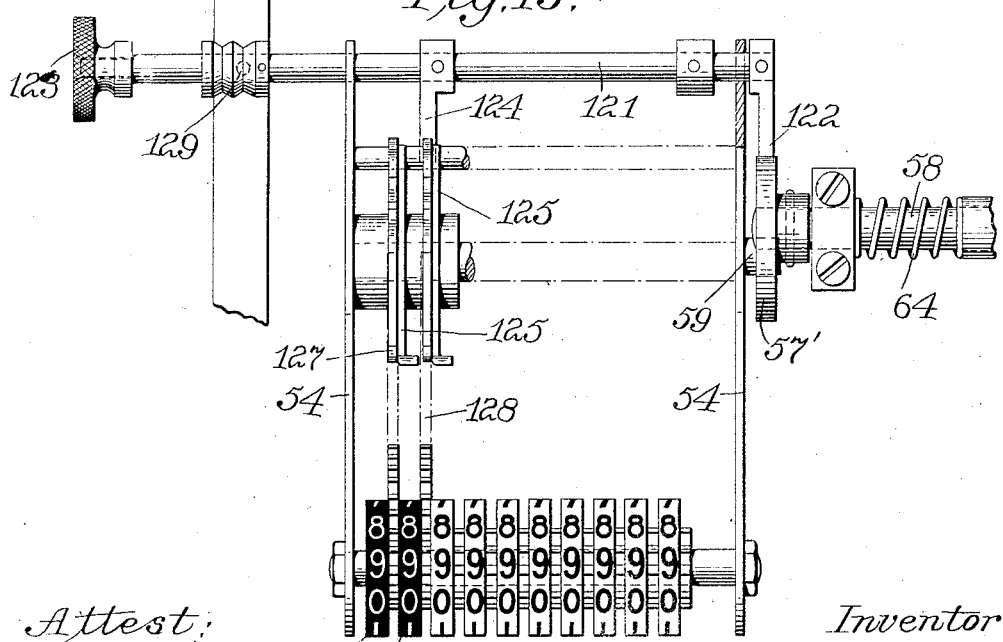

UNITED STATES PATENT OFFICE.

JOHN H. TRIMBLE AND CHARLES F. FINK, OF BALTIMORE, MARYLAND, ASSIGNORS TO HARRY E. KARR, OF BALTIMORE, MARYLAND.

CALCULATING-MACHINE.

1,326,428.   Specification of Letters Patent.   Patented Dec. 30, 1919.

Application filed August 13, 1914, Serial No. 856,655. Renewed June 13, 1919. Serial No. 304,092.

*To all whom it may concern:*

Be it known that we, JOHN H. TRIMBLE and CHARLES F. FINK, citizens of the United States, residing at Baltimore, Maryland, have invented certain new and useful Improvements in Calculating-Machines, of which the following is a specification.

The invention relates to calculating machines of the general type disclosed in Letters Patent of the United States of Dudley and Dudley, #712,777, of November 4, 1902, involving, as it does, a series of selectors or digit wheels mounted in a carriage and movable as a group axially into and out of connection with accumulator mechanism, said digit wheels being set up or displaced circumferentially in accordance with the values of the keys struck, and after having engaged the accumulator wheels the values are transferred from the set-up selector or digit wheels by restoring the digit wheels rotatably to their former positions. The accumulator mechanism shown herein is like that disclosed in Letters Patent of the United States granted to S. B. Austin, 1,071,382, August 26, 1913, and some features are like those disclosed in application for Letters Patent of the United States filed by S. B. Austin, 744,981, January 29, 1913.

The present invention has as one of its objects to render the machine light of touch and reduce the amount of effort necessary to be expended on the part of the operator, rendering the machine capable of a high speed.

Other objects of the invention will be clear from the following description and claims.

In the accompanying drawings

Figure 1 is a vertical sectional view of the machine from front to rear with parts in elevation;

Fig. 2 is a side elevation of the machine with parts in section;

Fig. 3 is a diagrammatic view showing more particularly the repeat or multiplying connections;

Fig. 4 is a detail view of the cam feature returning the escapement carriage and means for controlling the operation of this cam;

Fig. 5 is a side view of one of the digit wheels and one of the power arms, the said power arm being shown at the intermediate position of its stroke at the moment that it becomes clutched to the digit wheel;

Fig. 6 is a view similar to Fig. 5 but in addition showing one of the power arms moved to the limit of its stroke;

Fig. 7 shows one of the digit wheels in edge view, together with its power arm and the stop mechanism which determines the point of engagement of the power arm with the digit wheel;

Fig. 7ª is a sectional view along the shaft of the digit wheel showing in front elevation the escapement mechanism;

Fig. 8 is a sectional view showing parts in elevation of the accumulator mechanism and the full stroke mechanism;

Fig. 9 is a plan view of the machine with some parts omitted;

Fig. 10 is a plan view of the lower portion of the mechanism of the machine with parts omitted;

Figs. 11 and 12 are detail views relating to clutch mechanism for operating the pin drum;

Fig. 13 is a rear view of the machine with parts omitted;

Fig. 14 is a detail plan view of means for controlling the transfer of values from the digit wheels to the accumulator;

Fig. 15 is a detail view of an item counter mechanism.

The digit wheels 1 are normally located as a group to the right of the accumulator mechanism. They are mounted to turn about a shaft 2 and are movable as a group axially to engage or disengage the accumulator trains. They are arranged between the sides 3 of a carriage, which is movable along the shaft 2, being connected to a rack bar 4 of the escapement mechanism, which rack bar is under tension from a spring 5 through a lever 6 pivoted at its rear end to a bracket 7 fixed on the cross rod 8 of the fixed frame, said spring and lever tending constantly to move the group of digit wheels toward the left, but being controlled by escapement dogs of substantially the construction, though slightly modified, as that illustrated in Letters Patent of the United States of S. B. Austin, 1,188,878, June 27, 1916.

Each digit wheel has associated therewith a power arm 9, each arm being under tension of its own spring 10 connected at one end to the power arm, and at its other end to the rod 11 fixed to the sides of the digit wheel carriage. The springs tend to turn the power arms about the axis of the digit wheels in a direction the reverse of clockwise. Each power arm has a dog 12 pivoted thereto having a tooth 13 to engage the teeth of the digit wheel to which it belongs. The power arms with their dogs are located at the left of the digit wheel to which they belong. The dogs also have each a contact projection 13′ to strike stop means presently to be described, and each is pressed upon by a detent 14 pivoted at 15 to the power arm and under tension of a spring 16. The detents, one for each dog, are adapted to engage either one of two notches 17, 18, in the dogs, to thus maintain the dog either in its disengaged position of Fig. 1, i. e., with its tooth out of engagement with the teeth of its digit wheel, or in the position of Fig. 5 with its tooth in engagement with said digit wheel.

There are a series of latches 19 pivotally mounted on a rod 20 extending between the side of the carriage of the digit wheels and having traversing movement therewith, there being one of these latches for each arm, each latch being held normally in the position shown in Fig. 1 by a spring 21 to engage and hold the corresponding power arm against movement under the power of its spring 10. The springs 21 are attached at one end to the rod 22 extending between the sides of the carriage of the digit wheels, and connect with ears on the latches.

As shown in Figs. 1 and 9, there is arranged at the left hand end of the group of digit wheels (assuming they are in their inactive positions at the right hand limit of their traversing movement) a latch releaser 23 which comprises an arm overlying a part of the latch 19 of the left hand digit wheel. The drawing plan view, Fig. 9, shows the digit wheel carrier as having moved leftward two spaces so that the latch of the third digit wheel counting from the left is under this releaser. This releaser arm has its bearings on the fixed pin 24 on the standard 25. The releaser is held normally against a stop pin 26 on the standard by a spring 27, and when moved it is limited by a second stop 28. This releaser is operated by a lever 29 fixed at 30 on a pin or shaft 31 journaled in a bracket 32 on the standard 25, said shaft having a depending arm 32′ fixed thereto having at its lower end a universal bar 33 in the range of the depending ends 34 of the key levers 35 (this being a ten key machine).

These key levers are pivoted at 36 on a pin secured to the standard 25. The zero key 37 consists of a short bar, and its lever or lever frame is pivoted at 38 on a pin secured to the said standard. The key levers have rear extensions 40 each provided with an upwardly extending finger 41 to act against the lower arm of stop levers 42 pivotally mounted on a rod 43 held in fixed frame parts 44ˣ. The upper ends of these stop levers swing from right to left or transversely of the machine. They occupy a normal position with their upper ends in the same vertical plane from front to rear of the machine, and these upper ends are of different length and conform in position to the curve of the digit wheel circumference. These stop arms occupy a position under the digit wheel carriage supposing the digit wheel carriage is in its right hand position, but it will be observed that the contact or stop levers 42 are so positioned or mounted that their upper ends, with which the dogs on the power arms are to contact, lie to one side, i. e., the right of the vertical plane of the power arm or dog of the left hand digit wheel or selector when the digit carriage is occupying its extreme right hand or inactive position. Now, when a key is depressed, the stop lever corresponding thereto will be swung on its pivot 43 in a direction transversely of the machine from right to left, and will thus be set in line with the dog on the stop arm of this left hand digit wheel, so that when this power arm is released it will fly around until its dog strikes this stop or contact lever with, the result that the said dog will be set into engagement with its digit wheel and the further movement of the said power arm will set up this digit wheel through a number of teeth or spaces corresponding to the value of the key operated.

The arresting of the power arm takes place in different angular positions around the axis of the digit wheels according to the value of the key operated. At the same time the power arm is arrested the dog is operated by the contact of its projection with the stop extension of the stop lever, and the tooth of said dog is thus thrown into engagement with the tooth of the digit wheel.

It will be observed that if the nine key is operated, there will be comparatively slight idle motion of the power arm before its dog is thrown into engagement with the digit wheel, whereas if the 1 key is operated the power arm will rotate through a considerable angle before it becomes locked to the digit wheel by its dog engaging the same.

The digit wheels, when in their inactive position at the right of the machine, as in Fig. 9, are held against rotation by a spline bar having a high part w to engage the teeth of the digit wheels, and a low part $w'$ to free the digit wheels and allow them to rotate as they are moved axially and off from the high part.

The release of the power arm at the left of the group takes place while the digit wheel corresponding thereto and all those at the right thereof are held against rotation by the spline $w$, this release, as above stated, being due to the operation of the lever 29 from the universal bar 33.

Upon the release of the power arm it will move around the axis of the digit wheels, under the power of its spring, and upon its dog striking the stop arm or lever the tooth of the dog will be thrown into the tooth of the digit wheel, becoming locked thereto, the detent 14 acting to effect this locking.

Immediately after the dog strikes the contact or stop arm, an escapement action takes place. This, however, is not the full escapement action, but is sufficient only to move the group of digit wheels axially to the left so that the dog of the power arm which has just been released by the depression of its key and moved by its spring will move leftward from engagement with the contact arm 42 with which it has just engaged, and this will allow the power arm with the corresponding digit wheel locked thereto by its dog to complete its rotary movement of setting up this particular digit wheel and this setting up movement will continue until the dog strikes the stop or zero bar 44 mounted in the side frames of the digit wheel carrier. The slight leftward movement of the digit wheel carrier not only frees the dog of the operated power arm from the stop arm, but it also frees the corresponding digit wheel from the high part of the spline bar so that the setting up movement of the digit wheel in the arrow direction may take place.

It will be observed therefore that the arms or levers 42 do not actually act as stops in the ordinary meaning of this term, as the motion of the power arm from the time it is freed from the releaser arm is practically continuous up to the time the stop arm or its dog contacts with the zero or stop bar 44, the effect of the contact lever being to operate the dog to pick up its digit wheel during the practically continuous movement of the power arm. The arresting action is but momentary, and is not appreciable in the operation of the machine, thus enhancing the speed of operation.

This short escapement movement takes place on the final part of the downward movement of any key, and is derived from a universal plate or bar 45 adapted to be operated by any of the keys, said plate at its rear end being connected with the upright escapement bracket or arm 46 which is mounted to turn about the shaft or bar 47 fixed in the side frames of the machine, said bracket or arm being held between collars 48 fixed on the said rod.

The escapement bracket carries two dogs, a main dog 49 and a supplemental dog 50, both spring-pressed and adapted to engage a rack bar 4 which is fixed to the digit wheel carriage, as shown in Fig. 7ª. The dog 49 is normally in engagement with the rack bar. When the key is depressed it effects the release of the proper power arm, and its connection through its dog with the proper digit wheel, and in the final part of the downward movement of the key the dog 49 is released from the escapement rack and the dog 50 is brought into line therewith. This, however, has the effect of allowing the escapement bar to move far enough leftward to cause the release of the dog of the power arm from the stop bar 42 with which it contacts, and also far enough to move the selector or digit wheel off from the high part of the spline bar $w$ to permit the power arm to complete the setting up of the digit wheel by moving it in the arrow direction until the dog strikes the zero or stop bar 44.

As the key is raised under action of spring 52 the escapement post or standard 46 is rocked rearwardly by the spring 53, and the dog 50 is withdrawn from the escapement bar while the dog 49 is moved into line therewith, and as the tooth which the dog 49 engaged with previously has passed, the spring of the digit carriage will cause the said carriage to move until the next tooth of the escapement bar engages the said dog 49 and thus the full escapement movement of the digit wheel carrier will be completed and the chosen selector or digit wheel will now be in line with one of the gear trains of the accumulator mechanism.

This divided step action of the escapement to get one full movement is of advantage, as by it the setting up of the digit wheels can be effected on the downward stroke of the key. Further, time is given for the releaser to return to normal position before the full escapement movement takes place, and further it is impossible to get any effect from the operation of a second key while the first key is held down. It may be mentioned here that by the use of the stop or contact levers interposed between the tails of the key levers and the digit wheels and their power arms a uniform key action is secured. The stop levers are pressed by springs $42^x$ so that their arms $42^a$ are held normally against the stop shoulder $42^b$ on the frame bracket. These stop levers are thus held with their upper ends in line with each other from front to rear, and these upper ends all lie normally to the right of the path of the power arms and their dogs. The tails or lower ends $42^c$ of these stop levers extend therefrom at different angles because the upwardly extending fingers 41 on the tails of the key levers lie in different planes. Furthermore, the lower ends of the tails or arms 42c are formed on different inclines corresponding to the degree of lift which the fingers 41 have, they being located at different distances from the common pivot point 36 of the key levers. For instance, the incline of the stop lever operated by the nine key is at a very low angle, while that for the one key is at a steep angle, the lift of the finger 41 of the nine key being shorter than the finger 41 on the one key. By reason of this a uniform key action is obtained.

The digit wheels having been set up and moved axially into line with the accumulator trains, the next action is to transfer their values onto the accumulator, and this is done by pulling a handle 53 forward.

It may be noted first, however, that the digit wheels, when set up and moved axially to aline with the proper accumulator trains, are not in mesh therewith, because the accumulator mechanism is normally held above the line of travel of the digit wheels. It is necessary, therefore, first to throw the accumulator mechanism down so that its gears will mesh with the digit wheels. The details of the accumulator are not fully shown, but may be like those disclosed in the application above referred to. The frame 54 carrying this mechanism is pivotally mounted on a frame rod 8 and is held normally up by a spring 56. The movement of the accumulator frame is limited by a frame bar 57 which engages a forked portion of the accumulator frame.

When the handle is drawn forward the first action resulting is the depression of the accumulator frame. This is effected by a cam 57' fixed on a shaft 58 journaled in the fixed frame of the machine, said cam operating upon a pin or roller 59 in the side of the accumulator frame. This shaft is operated always in a forward direction—see the arrow in Fig. 1—and its movement is derived from a clutch member 60 splined at 61 by pin and slot to the shaft, this clutch member having a tooth engaging a clutch member 62 on a gear 63 loose on the said shaft. A spring 64 presses the clutch member 60 into engagement with the other member 62. The gear 63 is driven or oscillated by an idler gear 65, and a gear segment 66 on the shaft 67 which, as in the application above described through a gear 66' on a shaft 70, drives the shaft of the pin drum through the clutch shown in said application at 68.

The gear 66' is driven from the segment 66 fixed on the rear shaft 67, and this shaft is oscillated by an arm 71 thereon, a link 72 and an arm 73 on the pin or stub shaft of the handle.

The accumulator frame having been lowered by the first part of the movement of the handle, the next action is to restore the set-up digit wheels back circumferentially to normal position, and this is done by a restoring bar 74 which is carried by arms or frames 75 fixed to the shaft 2 on which the digit wheels are loosely mounted.

This restoring bar extends through slots in the digit wheels, and by striking against the end wall of these slots it will turn clockwise any selector or digit wheel which has been set up or turned from normal position. This motion of the restoring bar from the position shown in Figs. 1 and 3 is derived through a link 75' connected with a cam lever 76 pivoted on a pin 77 fixed in the frame, said lever being operated by a cam 78 on the oscillating shaft 70.

After the restoring bar has operated in the arrow direction, and has returned the various digit wheels from set up to normal position, the further movement of the handle causes a cam 79 on the rear shaft to engage a roller 80 on the lever 6 which connects with the carriage rack bar, and thus return the carriage to the right with the digit wheels to inactive position.

In the restoring action above described it is of course necessary to restore the power arms as well as the digit wheels, and for this purpose a restoring bar 81 is carried in arms 82 loose on the shaft 2 of the digit wheels, there being one of these arms at each end of the said shaft. These arms for straight addition are connected to the shaft through catches 83 pivoted to the arms and engaging notches in the arms or frames or disks 75 which carry the restoring bar 74 for the digit wheels. When, now, the said frames 75 are moved to restore the digit wheels, they will through the catches 83 move the arms 82, and as these carry a second restoring bar 81, this will strike all of the power arms which have been operated, and these will be restored to normal position and they will be held in their restored positions by the latches before referred to. This restoring action of the power arms will also have the effect of restoring the power arm dogs to normal position to be held by their detents, as shown in Fig. 1, and this is due to the inclined face of the tooth of the dog working on the adjacent tooth of the digit wheel. This restoring action of the dog theoretically will take place when the digit wheel strikes the spline bar $w$, the power arm continuing its movement to normal position, will force the inclined tooth of the dog to ride on the now stationary tooth of the digit gear with the result that the dog will be moved out of engagement with its digit wheel to be held by its detent, but in practice it is found that the restoring movement of the digit wheel will lag behind the restoring action of the power arms owing to the resistance offered by the accumulator trains, and this relative displacement between the power arms and the digit wheels will be sufficient to make the inclined face of the dog tooth ride on the tooth of the digit wheel and be turned back to normal position, and then the detent engaging the first tooth of this dog will hold it in position for another operation of the machine.

In the restoring action the low part of the spline bar will serve as a stop for the digit wheel, and when the digit wheel is moved rightward to inactive position the notch 86 will engage the high parts of the spline, and the digit wheel will be held in normal position.

The digit wheels are provided with an untoothed portion at 87 which will allow them to turn past the spline bar in their setting up action as soon as the said wheels are released from the high part of said bar.

Now for multiplying, a repeating key 85× is operated and held down. One effect of the operation of this key is to disconnect the power arm restoring means from the restoring mechanism of the digit wheels, and another effect is to throw out of operation the mechanism for returning the digit wheel carriage to the right to inactive position. The digit wheels will now remain in their relative set up positions in which they have been displaced circumferentially, and therefore by oscillating them they will transfer the same values repeatedly to the accumulator trains, and thus effect multiplying.

The values will be transferred as in straight addition on the forward movement of the handle, that is, when the accumulator frame is moved down with its trains in engagement with the digit wheels.

When, however, the reverse movement of the handle and of the digit wheels takes place, the accumulator frame is at this time raised by its spring, and this reverse movement of the digit gears will not be transmitted to the accumulator trains, this allowing the digit wheels to get back to set-up position ready to transfer their values to the accumulator trains again when the handle is again moved forward, the accumulator trains at this time being again thrown down to engage the digit wheels.

The throwing out of operation of the power arm restoring mechanism for repeating or multiplying as just mentioned is effected by releasing the catches 83 from the restoring arms or frames 75 of the digit wheel restoring bar, and for this purpose fingers 86× are fixed to a cross shaft 87× which is journaled in the machine frame and operated from the repeat key by an arm 88 and link 89 and an arm 90 on a shaft 91, said shaft being operated by an arm 92 having a pin and slot connection 93 with the repeat key lever which is pivoted at 94. The catches 83 are pressed by springs 95. When the repeat key is operated and the catches are thrown out, it will be seen that movement of the restoring frames or arms for the digit wheels will not operate the restoring bar 81 of the power arms, but these power arms will remain in connection with the digit wheels, and when they are given their reverse position the springs of the power arms will be distended ready to set the digit wheels up again as the hand lever goes back.

On the releasing of the catches 83 the fingers 86× engage pins 83× on the catches, and these fingers have hooked extremities which engage under the pins and serve to hold the catches, together with the arms 82 and their power arm restoring bar 81, in the position which they occupied when the release took place.

The other effect of the operation of the repeat key is to render the restoring mechanism of the digit wheel carriage inoperative so that the operations of the handle will not disturb the alined position of the digit wheels in respect to the accumulator trains with which they are to engage, and thus repeated operation of the handle will repeatedly throw into the accumulator the values set up on the digit wheels.

This action of rendering the carriage return mechanism inoperative is done by preventing the operation of the carriage returning cam 79 on the rear shaft. For this purpose this cam is loosely mounted on the rear drive shaft 67 having a long sleeve 96 mounted on said shaft. The cam has a drive pawl 97 pivoted to its side, this pawl having a shoulder 98 with which a shoulder 99 contacts to drive the pawl and thus move the cam to act on the roller 80 and move the return lever to the left for returning the digit wheel carriage.

The shoulder 99 is on an arm 100 having a sleeve 101 fixed to the rear drive shaft 67. Now when the handle is on its forward stroke the rear shaft 67 is turned forwardly and brings the shoulder 99 against the shoulder 98 on the pawl 97, and thus turns the cam to return the digit carriage.

Now to prevent the operation of the cam when the handle is drawn forward, it is only necessary to throw the pawl out of working position so that the shoulder 99 will not contact therewith. This is done by a cam 102 on a sleeve 103 loose on the sleeve 101 of the arm 100, said cam having an inclined shoulder 104 to contact with the inclined end of the pawl and move it aside from the path of the shoulder 99. This cam has an arm 105 fixed on its sleeve which, through a link 106, is connected with an arm 107 on the shaft 87 before mentioned, this shaft being connected through the arm 88 and link 89 with the repeat key, so that the depression of the repeat key will throw out the pawl 97, and then the handle 53 may be moved back and forth without disturbing the alined position of the digit wheel carriage, and consequently repeating for multiplying can be done indefinitely.

The pawl is pressed to operative position by a spring 109. The arm 100 is pulled by a spring 110 and this spring through the arm, drive shaft, gearing, and other connections described restores the handle to its rearward position.

Error eliminator.

To eliminate errors in the setting up action we provide means whereby the set up selectors or digit wheels which may have been erroneously set up may be restored to normal position, and then moved axially back to inactive position without transferring their values onto the accumulator.

For this purpose it is only necessary to prevent the depression of the accumulator frame at the time the handle is pulled forward so that while the digit wheels are thereby restored and moved axially to their inactive positions no transfer of values will take place. For this purpose we provide a finger lever 111 pivoted at 112 to a part of the fixed frame, said lever having an arm 113 to press on the flange 60 of the clutch 61. This finger lever is adjacent the main handle when the latter is at the rear limit of its stroke, so that while the hand grasps the main lever the operator can operate the finger lever with his fore finger, and thus press the clutch 61 back to disengage it from the clutch member 62 prior to the operation of the handle or during the fore part of its operation, and thus the accumulator frame will not be depressed and its gears will not mesh with the digit wheels. As above stated, the shaft 58 carrying this clutch always moves forward in its step by step movements, performing one complete revolution at each step. To lock this shaft after each revolution and prevent it from having rotary displacement backward, we provide a detent 114 pivoted to the frame and pressed by a spring into a notch in a disk 115 fixed on the shaft 58. To hold the clutch 60, 62 in unclutched condition when eliminating errors, we provide a notch 116 in the flange 60 of the clutch which, when the clutch is in normal position, is in line with a pin 117× on the under side of the frame bracket 118× to which the finger lever 111 is pivoted. When the finger lever is pressed the clutch member 60 is pressed back against the tension of the spring 64, and the notch passes by the pin so that said pin will now lie at the right of the flange 60, and therefore as the flange rotates under the action of the handle this pin bearing against the intact or unnotched portion of the flange will hold the clutch member 60 retracted for the full revolution, and thus there can be no depression of the accumulator frame during any part of this revolution.

On the backward movement of the main handle the gear 63 is rotated backwardly, carrying with it the clutch member 62. During this movement the shaft with the clutch member 60 is held by the detent 114 against backward rotation. The clutch tooth 62× being inclined on one side allows the action just stated to be performed.

We have provided means for locking the repeat key during the time the main handle is being operated, and also for locking the main handle against operation while the repeat key is in motion from normal position to its operative or effective position, the main handle, however, being released for operation when the repeat key has been moved to the limit of its stroke. This is to prevent any displacement of the parts by the main handle until after the adjustments for repeating or multiplying have been made. For this purpose we provide a locking disk 116× on the oscillatory shaft 70 which is geared to the main handle, as above described, and a lever 117 pivoted to the main frame at 118, the forward inclined end of this lever being engaged by an arm 119 on the shaft 91 which is operated by the repeat key. Now, when the main handle is drawn forward, the locking disk 116× will be turned in the arrow direction, Fig. 3, and will come over the rear end of the lever 117 and prevent it from rising, and thus the repeat key can not be operated. The locking disk has a concentric edge of sufficient extent to lock the lever 117 down during the entire forward and backward movement of the handle.

This locking effect on the repeat key is of course to take place when straight addition is to be performed. Supposing multiplying is to be performed, the repeat key is first operated to adjust the parts as above described for repeating, and during this act of adjustment, that is while the repeat key is on its downward movement the lever 117 is raised at its rear end by the arm 119 wiping against its front end, and the lever 117 will thus come in front of the locking disk 116× and prevent its rotation, and as this disk is connected to the main handle this will be locked against operation until the downward movement of the repeat key has been completed and the parts adjusted for multiplying. The release of the main handle is due to the arm 119 moving from off the upper edge of the lever 117 to a point over its inclined end, allowing the lever to rise at its front end under the tension of the spring 120 far enough to carry the rear end of the lever to the position shown in Fig. 3, and therefore below its point of locking engagement with the disk 116ˣ, thus releasing the handle so that it may now be operated for repeating or multiplying.

In order to indicate the number of times the main handle is operated, the two left hand register or total disks *a*, *b*, of the accumulator mechanism are utilized as counters. For so utilizing them we provide connections which may be set in operative position to set up on the disks one number the value of the numeral 1 for each time the main handle is operated. This connection is normally out of operative position. It includes a shaft 121 journaled in the side frames of the accumulator mechanism. This shaft is adapted to slide in its bearings, and it carries an arm 122 which, when the shaft is set to the left by pulling on its handle or knob 123 will be in range of the cam 57′, so that when this cam is turned to depress the accumulator frame for transferring the values onto the accumulator the said arm will be operated and the shaft turned in the arrow direction, Fig. 8, bringing an arm 124 thereon against the setting plate 125 of the second accumulator train counting from the left, and thus this setting plate will have its tail piece moved into the range of the pins on the pin drum 126, and when this is turned on the backward movement of the handle as in the Austin construction above described the pawl 127 carried by this setting plate will operate the carrying gear 128 and this number will show on the register or totalizing disk. When the main handle has been pulled ten times the tens will be carried to the next accumulator train at the left and displayed, this carrying action being the same as described in the Austin construction above mentioned. The shaft, when shifted longitudinally, is held in either position by a spring detent 129. The knob 123 is swiveled to the shaft so that it will be impossible for a person ignorant of the working of this part of the machine to turn the shaft by hand, and thus erroneously effect a setting action of the setting plate through the arm 124.

*Full stroke mechanism for main hand lever.*

Mechanism is provided whereby when the main handle is started on its forward stroke it can not be moved backward until its full stroke is completed and conversely when the handle is started on its rearward movement its full stroke must be completed before it can be moved forwardly.

This mechanism consists of a toothed wheel 130 fixed on the rear shaft 67. A disk 131 is fixed on the pin drum shaft having two angular notches 132 to be engaged by pins or rollers 133 on a detent 134 pivoted to the fixed bracket or frame part 135, and an arm 136 also pivoted to said bracket, the said parts being under tension of a spring 137. The detent 134 has its tooth so formed that it will allow the toothed disk 130 to turn forward in the arrow direction, Fig. 8, but will prevent movement of said disk in the reverse direction. A second detent 138 is pivoted to the bracket at 139 and connected by a spring 140 with the arm 136, which arm has its end adapted to bear on the tail of the detent 138. The tooth of this detent will permit movement of the disk 130 in a direction reverse to that of the arrow in said Fig. 8, but will prevent movement of the disk in the arrow direction.

The disk 131 has movement only in a forward direction, see the arrow in Fig. 8, because it is fixed to the shaft of the pin drum. This pin drum is driven forward when the main handle is going backwardly.

It is driven through a clutch 68 on the shaft 70, which is geared to the handle, this clutch having forward and backward movement but being effective to turn the pin drum only on its forward stroke. It is provided with an inclined tooth 142 engaging a corresponding notch or recess in the end of the pin drum, the clutch being pressed into engagement by a spring 143. This pin drum is substantially the same as that disclosed in the patents of Dudley and Austin above mentioned, and needs no particular description herein, its function being to operate the setting plates of the accumulator mechanisms to carry tens from order to order.

The drawing, Fig. 8, shows the parts when the main handle is at the limit of its rearward stroke. The detent 138 is now out of operation while the detent 134 is in engagement with the toothed wheel 130, and the rollers or pins 133 are resting in the notches 132, having thus acted to center the position of the disk 131 and the pin drum when the previous movement of these parts was completed, and having acted also to prevent overthrow. Now, as the main handle is pulled forward, the disk 131 remains at rest and the detent 134 is in engagement with the toothed disk 130. This disk can turn under the detent in the arrow direction, but not in the reverse direction. The disk 130 is toothed only along one-half of its circumference, and when the main handle is pulled forward the disk rotates about 103 degrees, that is, more than a quarter turn and less than a half turn. Therefore, when the handle completes its forward movement the detent 134 will be overlying the plain periphery of the disk, and then the handle can be started back. The detent 138 however at this time will be overlying the toothed part of the disk 130. Now, when the handle is started rearwardly the pin drum will be turned to effect the carrying operation and the disk 131 will turn with it in the arrow direction, Fig. 8, and the inclined edges of the notches 132 acting as cams on the rollers or pins 133 will cause them to move radially outward, thus withdrawing the detent 134 to inoperative or disengaged position or out of engagement with the toothed disk, but the arm 136 will also be operated or pressed outwardly in relation to the disk 131, thus straining the spring 140 and setting the other detent 138 against the toothed wheel 130, which will arrest the rotation of this disk and consequently will lock the handle if this is pulled forward at any point of its backward stroke. In other words, the disk 130 can rotate in a direction opposite to that of the arrow, Fig. 8, while the detent 138 is in engagement and thus the backward movement of the handle can take place, but should the handle be drawn forward at any point of its backward stroke, it will be locked against such forward movement by the detent 138. On the completion of the stroke backward the rollers or pins 133 will fall into the notches 132 and thus center the pin drum and prevent overthrow thereof.

As shown in Fig. 1, the springs 52 are used to apply tension to the even numbered keys, while the springs 52ˣ are used to apply tension to the odd numbered keys. The key levers of these keys are of different lengths and consequently have different leverage actions, and the springs 52 and 52ˣ are connected to the tail portions of these key levers at different points thereon according to the length of the levers, the object being to secure a uniform tension on the keys. At 142, Fig. 3, an adjustable stop is provided for the connection which is operated from the handle for restoring the digit wheels to normal position, the purpose of this stop being to arrest this connection in such a position that the restoring bar 81 for the power arms will have a clearance between it and the edges of the slots in the digit wheels, as shown in Fig. 6, so that as these digit wheels are moved axially these edges will not bear on the restoring bar 81, and thus create undue friction.

Reverting to the clutch 68 for operating the pin drum, means are provided, as shown in Figs. 10, 11 and 12, for preventing any irregular action of the hand lever 53 from displacing the pin drum. As above stated, the clutch 68 is pressed by a spring 143 to its work. This clutch rotates forwardly in the direction of the arrow, Fig. 10, as the handle is moved rearwardly, and conversely it rotates in reverse direction to the arrow as the handle 53 is moved forwardly. If, therefore, on the forward stroke of the handle, an irregular movement should be given thereto, such as a jerky movement, in which the forward movement would be arrested and pressure exerted rearwardly, there would be a tendency for the tooth 142 to displace the pin drum 126. Means are therefore provided whereby the clutch 68 will be held locked out of engagement with the end of the pin drum during the forward movement of the hand lever and therefore the backward movement of the clutch. It will be noted that as the clutch moves rearwardly its tooth being inclined will ride up on the inclined part 145 of the recess in the pin drum, and the clutch will be pressed along the shaft 70 in opposition to the spring 143. This movement will be sufficient to bring an incline of the rib 146 to work against a locking post 147, with the result that an additional movement of the clutch along its shaft 70 will take place, and then the locking post will engage the inner face of the rib 146 and hold the clutch disengaged from the pin drum during the full movement forwardly of the handle 53. As shown in Fig. 12, the rim 146 has two openings at 148 for the locking post 147 to pass through, and there is an incline 149 at each of these notches, as shown in dotted lines in said figure, to work against the post 147 for further retracting the clutch from engagement with the pin drum.

We claim as our invention:—

1. In combination in a calculating machine, a series of digit wheels, means operated by the keys for setting up the digit wheels according to the value of the keys operated, a carriage for the digit wheels, an escapement for the carriage, a handle with connections for returning the carriage to inactive position, said connections including a cam and a lever operated thereby, and connected with the carriage, and a pawl for operating the cam, a repeat key, and connections therefrom to the pawl for throwing it out of operation.

2. In combination a series of digit wheels, accumulator mechanism, key connections for setting up the digit wheels in positions circumferentially corresponding to the values of the keys operated, a handle, a connection for restoring the digit wheels to normal position circumferentially to thereby transfer their values onto the accumulator mechanism, and a finger piece adjacent the handle to be operated by a finger of the same hand which operates the handle, with connections controlled by said finger piece for eliminating the function of transferring the values onto the accumulator when the handle is operated, substantially as described.

3. In combination a series of digit wheels, accumulator mechanism, key connections for setting up the digit wheels circumferentially to different positions corresponding to the values of the keys operated, a handle for restoring the digit wheels to normal position to thereby transfer their values onto the accumulator mechanism when engaged with said digit wheels, connections from the handle for causing the engagement of the digit wheels and accumulator mechanism, said connections including a clutch, and a finger piece adjacent the handle to be operated by a finger of the same hand which grasps the handle for throwing the clutch out of operation, and thus eliminating the function of transferring the values onto the accumulator mechanism in order to correct errors, substantially as described.

4. In combination a series of digit wheels, accumulator mechanism, key connections for setting up the digit wheels circumferentially to different positions corresponding to the values of the keys operated, a handle for restoring the digit wheels to normal position to thereby transfer their values onto the accumulator mechanism when engaged with said digit wheels, connections from the handle for causing the engagement of the digit wheels and accumulator mechanism, said connections including a clutch, a finger piece adjacent the handle to be operated by a finger of the same hand which grasps the handle for throwing the clutch out of operation and thus eliminating the function of transferring the values onto the accumulator mechanism in order to correct errors, and means for locking the clutch out of operation during one full stroke of the handle, said locking means being rendered effective by the operation of the finger piece, substantially as described.

5. In combination a series of digit wheels, accumulator mechanism, key connections for setting up the digit wheels circumferentially according to the values of the keys operated, a handle with connections for restoring the digit wheels to normal position to thus transfer the values onto the accumulator mechanism to be engaged by said digit wheels, said accumulator mechanism having movement to and from engaging position with said digit wheels, connections from the handle for operating the accumulator mechanism into engaging position, and a detachable member in said connection for preventing the operation of the handle from moving the accumulator mechanism to engaging position, and a finger piece adjacent the handle for operating the said detachable member, substantially as described.

6. In combination a series of digit wheels, accumulator mechanism, key connections for setting up the digit wheels circumferentially according to the values of the keys operated, a handle with connections for restoring the digit wheels to normal position to thus transfer the values onto the accumulator mechanism to be engaged by said digit wheels, said accumulator mechanism having movement to and from engaging position with said digit wheels, connections from the handle for operating the accumulator mechanism into engaging position, and a detachable member in said connection for preventing the operation of the handle from moving the accumulator mechanism to engaging position, and a finger piece adjacent the handle for operating the said detachable member, said detachable member consisting of a one-revolution clutch and said handle connection including a cam having forward movement only from said clutch, substantially as described.

7. In combination digit wheels, accumulator mechanism, key connections for setting up the digit wheels, a handle with connections for restoring the digit wheels to normal position circumferentially to thereby transfer the values onto the accumulator mechanism when engaged therewith, an escapement carriage for moving the digit wheels axially, connections controlled by the handle for returning the digit wheels axially to inactive position, a repeat key for eliminating the function of said carriage returning connection, means operated by the repeat key for permitting the operation of the handle to repeat the transferring actions, means operated by the repeat key for locking the handle against operation during the operation of the repeat key, said means including a locking disk connected with the handle, and a lever operated by the repeat key to have locking engagement with said disk or arm, substantially as described.

8. In combination digit wheels, accumulator mechanism, key connections for setting up the digit wheels comprising power arms, under spring tension, for engaging the digit wheels at points thereon corresponding to the complement of the values of the keys operated and thereafter moving them to set up position, a handle with connections for restoring the digit wheels to normal position circumferentially to thereby transfer the values onto the accumulator mechanism, a detachable connection whereby the movement of the handle at times will restore the power arms to normal position released from their respective digit wheels, an escapement carriage for moving the digit wheels axially, connections controlled by the handle for returning the digit wheels axially to inactive position, said connections including a detachable member, and a repeat key for operating the detachable restoring connection of the power-arm, and for operating the detachable member to prevent the axial return of the digit wheels whereby, upon operation of the handle repeated transfer of the values may be effected from the digit wheels to the accumulator mechanisms.

9. In combination a series of digit wheels, key connections for setting up the digit wheels, accumulator mechanism, a handle with connections for restoring the digit wheels circumferentially to normal position to thereby transfer their values onto the accumulator mechanism when engaged by the digit wheels, a repeat key with connections for permitting repeated operations of the handle to repeat the transferring actions, locking means for the repeat key controlled by the handle to prevent the operation of the repeat key when the handle is operated, said locking means consisting of a locking arm or disk connected with the handle, and a lever between the same and the repeat key, substantially as described.

10. In combination in a calculating machine, a series of digit wheels, a carriage for said digit wheels movable axially, a power member for each digit wheel movable about the axis of the digit wheels, means for releasing the power members in succession as the keys are struck, means to clutch the power members to their digit wheels after idle movements have taken place corresponding to the complement of the value of the keys operated, means for setting the digit wheels free for rotation under the action of the power members when the latter are clutched thereto, and means for limiting the rotary movement of the digit wheels under the action of the power members to thereby set up the digit wheels, accumulator wheels with which the set up digit wheels engage, and means for restoring the set up digit wheels to thereby transfer the values to the accumulator mechanism and for returning the digit wheels to position out of engagement with the accumulator wheels, substantially as described.

11. In combination in a calculating machine accumulator mechanism, a series of rotary and axially movable digit wheels, means for holding them against rotation while in normal position at the right of the accumulator wheels, power members normally disengaged from their respective item wheels controlled from the keys for engaging their digit wheels after idle movements of said power members have taken place at points circumferentially thereof corresponding to the complement of the values of the keys operated, means for moving the digit wheels axially to be released in succession from their holding means and thereon to be operated by their power members, and a stop for limiting the rotary movement of the digit wheels under the action of their power members to thereby set up the digit wheels, and means for effecting the transfer of values from the digit wheels to the accumulator wheels and for returning the digit wheels axially to the right, substantially as described.

12. In combination a series of toothed digit wheels, a carriage for moving the digit wheels axially as a group, a power member for each digit wheel movable about the axis of the said digit wheels, said power members having means to be clutched to and unclutched from the teeth of the digit wheels, a spline bar for holding the digit wheels against rotation when the group is in inactive position, means for giving a one-step movement to the carriage for each key action, the digit wheels being thereby released from the spline bar in succession, key-controlled means for determining the point at which the power member will clutch itself to the digit wheel while held by its spline, said digit wheels, when released, turning under the action of the power members to set up position, and stop means for determining this set up position, accumulator means, and means for operating the set up digit wheels to transfer their values onto the accumulator, substantially as described.

13. In combination a series of digit wheels, means for holding them against rotation, power members normally inactive but when active rotating the digit wheels to set-up position, key-controlled means for releasing the power members and determining the different points circumferentially of the item wheels at which the power members will engage the digit wheels after performing idle movements, key-controlled means for releasing the digit wheels to allow them to be turned by the power members and thereby be set up according to the values of the keys operated, and stop means for arresting the digit wheels in set-up position, and means for operating the digit wheels to transfer their values onto the accumulator, substantially as described.

14. In combination keys, a series of digit wheels, a step by step carriage therefor for moving them axially as a group, a power member for each digit wheel movable about the axis thereof and normally unclutched from said wheels, means on the carriage for holding the power members out of operation, releasing means for the power members, said releasing means being controlled from the keys and releasing the power members in succession as they are brought thereto by the axial step by step movement of the carriage, key-controlled means for causing the clutching of the power members to their digit wheels, a spline bar for holding the digit wheels against rotation but releasing them in succession as they are moved axially, and stop means for limiting the movement of the digit wheels in set up position, and means for operating the set up digit wheels to transfer their values onto the accumulator mechanism, substantially as described.

15. In combination keys, a series of digit wheels, a carriage therefor for moving the digit wheels axially, spring operated power members one for each digit wheel normally disengaged from the digit wheels and key-controlled means for clutching the spring power members and causing them to turn the digit wheels to different set up positions, accumulator mechanism and means for operating the digit wheels to transfer their values onto the accumulator mechanism, substantially as described.

16. In combination accumulator mechanism, a series of digit wheels, a carriage for moving said wheels axially, escapement mechanism for moving the carriage step by step, a spring power member for each digit wheel to be clutched to or released from the digit wheels movable about the axis thereof, holding devices for said spring power members, a key-controlled member to which the holding devices are brought in succession by the step by step movement of the carriage for releasing the spring power members, key-operated stops arranged in one plane lying transversely of the axis of the digit wheels to act on the power members in succession, clutching dogs carried by the power members and operated by the key stops to clutch said members to the digit wheels, means for holding the digit wheels against rotation, said means releasing the digit wheels in succession as they are moved axially step by step, and means for then arresting the movement of the digit wheels, under the action of the power members, to thereby set up said digit wheels, and means for transferring the values from the said digit wheels to the accumulator wheels, substantially as described.

17. In combination a series of digit wheels, a power member for each digit wheel, key-operated means for releasing the power members, and key-controlled means for effecting engagement between the power members and the digit wheels after the power member has moved through an angle corresponding to the complement of the value of the key operated, the further movement of the power member setting up the digit wheel, and means for restoring the digit wheels rotatively to thereby transfer the values onto accumulator mechanism, substantially as described.

18. In combination a series of digit wheels, a power member for each digit wheel, key-operated means for releasing the power members, key-controlled means for effecting engagement between the power members and the digit wheels after the power member has moved through an angle corresponding to the complement of the value of the key operated, the further movement of the power member setting up the digit wheel, means for restoring the digit wheels rotatively to thereby transfer the values onto accumulator mechanism, and means for restoring the power members rotatively to normal position, substantially as described.

19. In combination digit wheels, a carriage therefor, an escapement mechanism for the carriage, power members mounted on the carriage for operating the digit wheels, key-operated means controlling the power members to set up the digit wheels, a restoring member for the digit wheels, a restoring member for the power members, means returning the digit carriage axially to normal position, a repeat key, means controlled thereby to throw out of operation the carriage returning means, means also controlled by the repeat key for rendering inoperative the restoring member of the power member, and a handle with connections to the digit wheel restoring member for operating the same in one direction, the power members operating the digit wheels in the other direction, substantially as described.

20. In combination digit wheels, a carriage therefor, an escapement mechanism for the carriage, power members mounted on the carriage for operating the digit wheels, key-operated means controlling the power members to set up the digit wheels, a restoring member for the digit wheels, a restoring member for the power members, means for returning the digit carriage axially to inactive position, a repeat key, means controlled thereby to throw out of operation the carriage returning means, means also controlled by the repeat key for rendering inoperative the restoring member of the power member, and a handle with connections to the digit wheel restoring member for operating the same in one direction, the power members operating in the other direction, and means for automatically engaging and disengaging the set up digit wheels and the accumulator trains with and from each other, substantially as described.

21. In combination a series of digit wheels, a carriage therefor, a power member for each digit wheel, means mounted on the carriage for retaining the power members in position ready to act, key-controlled means for releasing the power members in succession as the carriage moves step by step, key-controlled means for determining the point in the movement of the power members at which they will be clutched to the digit wheels, a stop bar against which the power arm strikes to determine the set up position of the digit wheels, a handle, restoring means for the digit wheels having connection with the said handle, and restoring means for the power members operated from the said handle, substantially as described.

22. In combination a series of digit wheels, a carriage therefor, escapement mechanism for moving the carriage step by step, a series of spring-pressed power members pivoted axially of the digit wheels, a clutch dog for each power member to connect the same with its digit wheel, means mounted on the carriage for holding the power members against movement, key-controlled means located at a fixed point in relation to the movable carriage for releasing the power arms in succession, key-controlled means for determining the points in the travel of the power members at which their dogs will engage the digit wheels, a spline bar for holding the digit wheels normally against rotation, said digit wheels being released from said spline bar one by one as the carriage moves step by step whereon the power member of the released digit wheel will turn the same to set-up position, a stop bar to limit the movement of said power member, a return bar for the digit wheels, a return bar for the power members, an operating handle, connections between said handle and the return bar of the digit wheels, a detachable member for operating the return bar of the power members from said connections, connections from said repeat key to the detachable connection of the return bar for the power member to render said return bar ineffective, means for returning the digit carriage to inactive position axially, connections from the repeat key to said means to render the same ineffective, and connections operated by the handle for engaging and disengaging the set-up digit wheels and accumulator trains, substantially as described.

23. In combination in a calculating machine, a series of digit wheels, a series of spring-pressed power arms, keys, means controlled by the keys to cause the power arms to pick up the digit wheels, and set them up, a carriage for the digit wheels, escapement mechanism for the carriage, restoring means for the digit wheels and power arms, returning means for the carriage, a handle with connections for operating the restoring means and the said carriage returning means, a repeat key, and connections operated thereby for rendering the handle and its restoring connections to the power arms and its connections to the carriage returning means ineffective so that upon the operation of the handle multiplication can be effected, substantially as described.

24. In combination in a calculating machine, a series of digit wheels, a carriage therefor, escapement mechanism for the carriage, spring pressed power arms one for each digit wheel, means for clutching the power arms to the digit wheels, key connections for controlling the points in the movement of the power arms at which said clutching will take place to thereby set up the digit wheels according to the values of the keys operated, a restoring bar for the digit wheels, a restoring bar for the power arms, a handle, connections between the said handle and the digit carrier restoring bar, a detachable device forming the connection between the handle and the restoring bar for the power arms, a repeat key for releasing said detachable device to permit the power arms to remain clutched to the digit wheels, and a detachable connection for returning the digit carriage to normal position controlled by the said repeat key, substantially as described.

25. In combination a series of digit wheels, accumulator mechanism, power arms for the digit wheels, key-controlled means for clutching the power arms to the digit wheels at points corresponding to the values of the keys operated, a carriage for the digit wheels, a stop for arresting the digit wheels in set-up position, a return bar for the digit wheels, arms carrying said return bar, a handle for operating the arms to restore the digit wheels circumferentially to normal position and thereby transfer the values onto the accumulator, a restoring bar for the power arms, catch means between said operating arms of the digit wheel return bar and the restoring bar of the power arms, a repeat key for releasing said catch means to allow the power arms to remain clutched to the digit wheels for multiplying by repeated actions of the handle, means for returning the digit wheel carriage to inactive position when the handle is pulled, and connections from the repeat key for eliminating the function of said carriage return means, substantially as described.

26. In combination in a calculating machine for a series of digit wheels, a spring operated power arm for each digit wheel, key connections for releasing the power arms, pick-up dogs on the power arms for engaging and setting up the digit wheels, stops or contact devices controlled from the keys for determining the points at which the dogs will pick up the digit wheels, stop means for arresting the digit wheels in set-up position, a digit wheel carriage, escapement mechanism for the digit wheel carriage, restoring means for the digit wheels and power arms, a handle with connections to the said restoring means, said connections including a detachable member to control the restoring of the power arms, a repeat key with connections to said detachable member to permit the release of the power arms from their digit wheels, means for returning the digit wheel carriage to inactive position, connections operated by the repeat key for rendering said returning means ineffective, and a handle with connections to the restoring means and the carriage returning means, substantially as described.

27. In combination in a calculating machine, a series of digit wheels, escapement mechanism for moving them axially, keys, power arms for the digit wheels to move them to set-up position, clutch means to connect the power arms with the digit wheels to pick them up, connections from the keys for rendering the power arms effective, contact means controlled by the keys for setting the clutches in engagement with the digit wheels, connections from the keys to the escapement mechanism for effecting an escapement movement of the digit wheels axially as soon as they are clutched to the power arms, and stop means for arresting the digit wheels in set-up position, accumulator mechanism, and a handle with connections to the digit wheels for transferring the values therefrom onto the accumulator mechanism, substantially as described.

28. In combination in a calculating machine, a series of digit wheels, escapement mechanism for moving them axially, keys, power arms for the digit wheels to move them to set-up position, clutch means to connect the power arms with the digit wheels to pick them up, connections from the keys for rendering the power arms effective, contact means controlled by the keys for setting the clutches in engagement with the digit wheels, connections from the keys to the escapement mechanism for effecting an escapement movement of the digit wheels axially as soon as they are clutched to the power arms, stop means for arresting the digit wheels in set-up position, accumulator mechanism, and a handle with connections to the digit wheels for transferring the values therefrom onto the accumulator mechanism, the said escapement movement of the digit wheels being in two steps for each complete movement, the first step freeing the power arm from the arresting effect of the contact or stop means to permit it to perform its full movement in setting up the digit wheel, and the second step moving the digit wheel into position for transferring its values onto the accumulator, substantially as described.

29. In combination in a calculating machine, a series of digit wheels, escapement mechanism for moving them axially, keys, power arms for the digit wheels to move them to set-up position, clutch means to connect the power arms with the digit wheels to pick them up, connections from the keys for rendering the power arms effective, contact means controlled by the keys for setting the clutches in engagement with the digit wheels, connections from the keys to the escapement mechanism for effecting an escapement movement of the digit wheels axially when they are clutched to the power arms, stop means for arresting the digit wheels in set-up position, accumulator mechanism, and a handle with connections to the digit wheels for transferring the values therefrom onto the accumulator mechanism, the said escapement movement of the digit wheels being in two steps for each complete movement, the first step freeing the power arm from the arresting effect of the contact or stop means to permit it to perform its full movement in setting up the digit wheel, and the second step moving the digit wheels into position for transferring its values onto the accumulator, the first escapement movement taking place on the same downward movement of the key which sets the stop or contact member in position for setting the clutch in engagement with the digit wheel and the second escapement movement taking place on the rise of the key, substantially as described.

30. In combination in a calculating machine, a series of digit wheels, spring pressed power arms one for each digit wheel, a dog on each arm to engage its digit wheel, keys, stop or contact means controlled by the keys for causing the dogs to pick-up the digit wheels at points corresponding to the values of the keys operated, means for arresting the digit wheels in set-up position, means for shifting the digit wheels axially into position for transferring, a restoring bar for the digit wheels, a restoring bar for the power arms, and connections for operating the said restoring bars, the said dogs being self-releasing from the digit wheels in restoring the said wheels to normal position, substantially as described.

31. In combination in a calculating machine, a series of digit wheels, a series of power arms, clutch dogs carried by the power arms for picking up the digit wheels, key-operated stops or contacts for determining the points at which the dogs will pick up the digit wheels, and detents on the power arms for holding the dogs in either of their positions, substantially as described.

32. In combination in a calculating machine, a series of digit wheels, spring-pressed power arms, key connections for controlling the operation of said power arms, key connections for determining the points at which the dogs of said power arms will pick up the digit wheels, and means for restoring the power arms and digit wheels to normal position, the said dogs being self-releasing during said restoring movement, substantially as described.

33. In combination a series of digit wheels, accumulator mechanism, a carriage for the digit wheels, escapement mechanism for the said carriage, spring-pressed power arms for the digit wheels, clutch dogs on the power arms for picking up the digit wheels, number keys and key levers, stops arranged in a curved group conforming to the periphery of the digit wheels independent of but operated from the key levers for contacting with the clutch dogs for causing them to pick up the digit wheels at points corresponding to the values of the keys operated, releasing means for the power arms controlled by the keys, said stops having inclined surfaces respectively at different angles to receive contact from the key levers whereby a uniform key action is secured, substantially as described.

34. In combination a series of digit wheels, accumulator mechanism, a carriage for the digit wheels, escapement mechanism for the said carriage, spring-pressed power arms for the digit wheels, clutch dogs on the power arms for picking up the digit wheels, number keys and key levers, stops arranged in a curved group conforming to the periphery of the digit wheels independent of but operated from the key levers for contacting with the clutch dogs for causing them to pick up the digit wheels at points corresponding to the values of the keys operated, releasing means for the power arms controlled by the keys, said stops having inclined surfaces respectively at different angles to receive contact from the key levers whereby a uniform key action is secured, said stops consisting of levers swinging in a direction transversely of the digit wheels and lying at different distances from the pivotal point of the key levers, substantially as described.

35. In combination digit wheels, a carriage therefor, escapement mechanism for the carriage, key operated connections for setting up the digit wheels according to the values of the keys operated, an accumulator mechanism normally positioned to be out of engagement with the digit wheels when the latter are shifted into line therewith, connections for restoring the digit wheels to normal position to transfer the values onto the accumulator, a handle for operating said connections, and connections operated by said handle for throwing the accumulator mechanism into engagement with the digit wheels for the transferring action, said last named connections including a cam with clutch mechanism between the same and the handle for operating the said cam only on the forward movement of the handle, substantially as described.

36. In combination in a calculating machine, a series of digit wheels, accumulator trains, key connections for setting up the digit wheels, a carriage for the digit wheels, escapement means for the carriage operated from the keys to place the set-up digit wheels in position for transferring values to the accumulator mechanism, said accumulator mechanism being normally out of position for connecting with the digit wheels, a handle, connections between the handle and the digit wheels for restoring them to normal position and thereby to transfer their values onto the accumulator, on the forward movement of the handle connections from the handle for throwing the accumulator mechanism into connection with the digit wheels on the forward movement of the handle and for effecting the withdrawal of the accumulator mechanism from the digit wheels on the backward movement of the handle, a repeat key with connections operated thereby for maintaining the digit wheels in position and condition for repeating the transfer of its values for multiplication upon the repeated operation of the handle, substantially as described.

37. In combination a series of digit wheels, a return bar for said digit wheels, power arms for moving the digit wheels, a restoring bar for the power arms, arms carrying the returning bar, a handle, a connection between the said handle and the said arms, said returning and restoring bars passing through slots in the digit wheels, and an adjustable stop for arresting the said connections in position to prevent engagement of the edges of the slots of the digit wheels with the restoring bar, substantially as described.

38. In combination a pin drum, a clutch for operating the said pin drum having axial movement, a spring for pressing said clutch into engagement with the pin drum, a handle with connections to the clutch for turning the same forwardly and backwardly, and means for locking the clutch out of engagement with the pin drum during the movement of the handle in one direction, substantially as described.

39. In combination a pin drum, a clutch having a tooth with an inclined side engaging the corresponding recess in the pin drum, said clutch being spring-pressed and movable axially against the said spring pressure, a handle, connections between the handle and clutch, a locking rim connected with the clutch and rotating therewith having notches and inclines adjacent said notches, a locking post, the notches of the rim allowing said rim to pass the post and the inclines on the rim engaging the post to withdraw the clutch and lock the same from the pin drum during one movement of the handle, substantially as described.

40. In combination a series of digit wheels, accumulator mechanism, key connections for setting up the digit wheels in position circumferentially corresponding to the values of the key operated, a handle with connections for restoring the digit wheels to normal position to thereby transfer their values onto the accumulator mechanism when engaged with said digit wheels, connections from the handle for throwing the accumulator mechanism into engagement with the digit wheels and manually controlled means for eliminating the function of the handle and said connections of throwing the accumulator into engagement with the digit wheels when the handle is operated, to thereby permit the restoring action of the digit wheels to take place without transferring their values onto the accumulator and thus permit the correction of errors which may have occurred in the setting up of the digit wheels.

In testimony whereof, we affix our signatures in presence of two witnesses.

JOHN H. TRIMBLE.
CHAS. F. FINK.

Witnesses:
E. A. BAILEY,
MARY REGAN.